US009442779B2

(12) United States Patent
Kaneda

(10) Patent No.: US 9,442,779 B2
(45) Date of Patent: Sep. 13, 2016

(54) INFORMATION-PROCESSING APPARATUS, INFORMATION-PROCESSING METHOD, AND PROGRAM

(75) Inventor: Takeshi Kaneda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1832 days.

(21) Appl. No.: 11/940,109

(22) Filed: Nov. 14, 2007

(65) Prior Publication Data
US 2008/0148288 A1 Jun. 19, 2008

(30) Foreign Application Priority Data

Dec. 13, 2006 (JP) ................................ 2006-336006

(51) Int. Cl.
G06F 13/00 (2006.01)
G06F 11/00 (2006.01)
G06F 3/12 (2006.01)
G06F 9/54 (2006.01)
H04L 12/24 (2006.01)
H04L 29/14 (2006.01)
H04L 29/06 (2006.01)

(52) U.S. Cl.
CPC .............. G06F 9/542 (2013.01); H04L 41/06 (2013.01); G06F 2209/544 (2013.01); H04L 69/28 (2013.01); H04L 69/40 (2013.01)

(58) Field of Classification Search
None
See application file for complete search history.

(56) References Cited

U.S. PATENT DOCUMENTS 6,734,985 B1    5/2004  Ochiai
7,676,562 B2 *  3/2010  Reistad ............... H04L 41/0233
                                                        709/223
7,856,638 B2 * 12/2010  Kaneda .................. H04L 41/06
                                                        358/1.15
2002/0133596 A1 * 9/2002  Border et al. ............... 709/227
2008/0144655 A1 * 6/2008  Beam ...................... H04L 67/02
                                                        370/466

FOREIGN PATENT DOCUMENTS

| EP | 2086203 A2 | 8/2009 |
| JP | 11-203094 A | 7/1999 |
| JP | 2000056939 A | 2/2000 |
| JP | 2000-137585 A | 5/2000 |
| JP | 2000137585 A | 5/2000 |
| JP | 2001043038 A | 2/2001 |

OTHER PUBLICATIONS

Don Box et al., Web Services Eventing, Mar. 15, 2006, XP002486468, Retrieved from the Internet: URL:http://www.w3.org/Submission/WS-Eventiing/>, 24 pages.
Box et al., "Web Services Eventing (WS-Eventing)," W3C Member Submission, Mar. 15, 2006, BEA Systems Inc., 2004-2006, pp. 1-6.

* cited by examiner

Primary Examiner — H S Sough
Assistant Examiner — Kimberly Jordan
(74) Attorney, Agent, or Firm — Canon U.S.A., Inc. IP Division

(57) ABSTRACT

An information-processing apparatus determines whether a source of a registration request transmitted thereto exists on a network in a predetermined range, and changes the valid period of registration of notification destination information on the basis of the determination result. Alternatively, an information-processing apparatus determines whether a notification destination that should be registered in response to a registration request transmitted thereto exists on the network in a predetermined range, and changes the valid period of registration of notification destination information on the basis of the determination result.

24 Claims, 10 Drawing Sheets

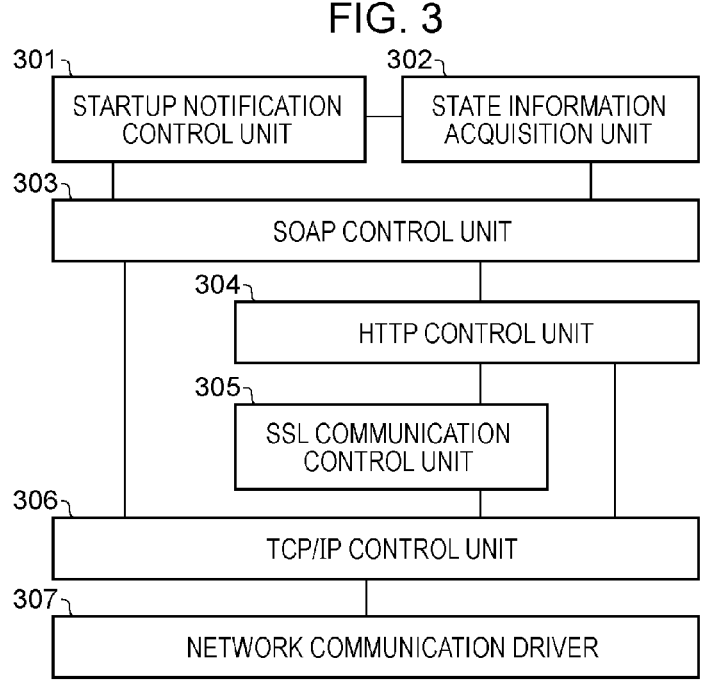
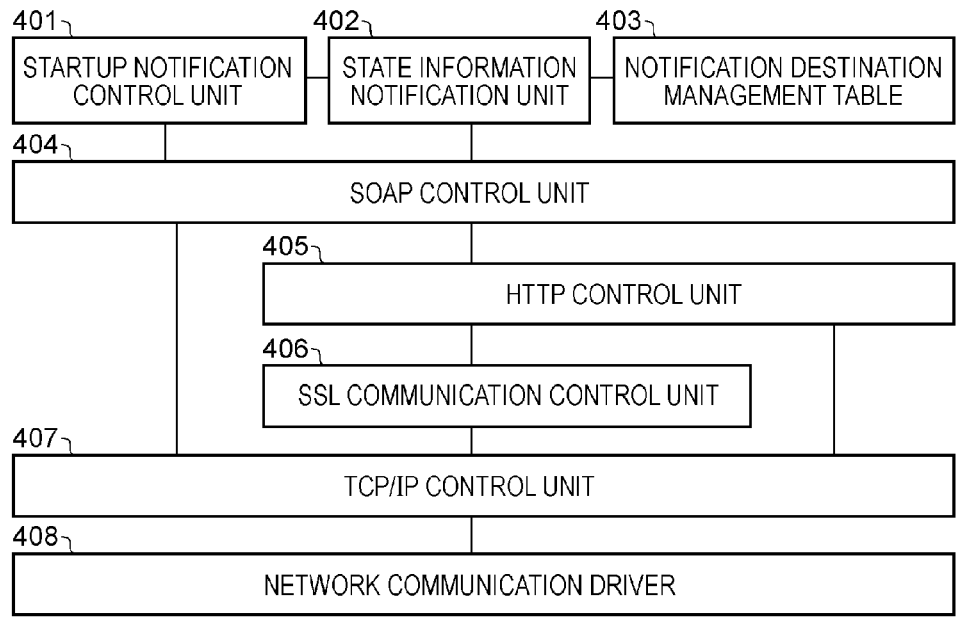

FIG. 6

```
<s:Envelope
 xmlns:a="http://schemas.xmlsoap.org/ws/2004/08/addressing"
 xmlns:d="http://schemas.xmlsoap.org/ws/2005/04/discovery"
 xmlns:i="http://printer.example.org/2003/imaging"
 xmlns:s="http://www.w3.org/2003/05/soap-envelope">
 <s:Header>
  <a:Action>
   http://schemas.xmlsoap.org/ws/2005/04/discovery/SubscribeStatusInfomation
  </a:Action>
  <a:MessageID>
   uuid:0a6dc791-2bc6-4991-9af1-454778a1917a
  </a:MessageID>
  <a:To>urn:schemas-xmlsoap-orgws:2005:04:discovery</a:To>
 </s:Header>
 <s:Body>
  <d:SubscribeStatusInfomation>                                  ─601
   <d:MACAddress>xx-xx-xx-xx-xx-xx</d:MACAddress>                ─602
   <d:IPv4Address>xxx.xxx.xxx.xxx</d:IPv4Address>                ─603
   <d:Type>XXServiceClient</d:Type>                              ─604
   <d:SubscribeStatus>XXServiceStatus</d:SubscribeStatus>
   <d:RequestDate>2006-10-7T17:20:15:000Z</d:RequestDate>        ─605
  </d:SubscribeStatusInfomation>
 </s:Body>
</s:Envelope>
```

FIG. 8

```
<s:Envelope
 xmlns:a="http://schemas.xmlsoap.org/ws/2004/08/addressing"
 xmlns:d="http://schemas.xmlsoap.org/ws/2005/04/discovery"
 xmlns:i="http://printer.example.org/2003/imaging"
 xmlns:s="http://www.w3.org/2003/05/soap-envelope">
 <s:Header>
  <a:Action>
    http://schemas.xmlsoap.org/ws/2005/04/discovery/
SubscribeStatusInfomationResponse
  </a:Action>
  <a:MessageID>
    uuid:0a6dc791-2be6-4991-9af1-454778a1917a
  </a:MessageID>
  <a:To>urn:schemas-xmlsoap-orgws:2005:04:discovery</a:To>
 </s:Header>
 <s:Body>
  <d:SubscribeStatusInfomationResponse>
    <d:Type>XXServiceServer</d:Type>                                  }-801    802
    <d:AcceptedSubscribeStatus>XXServiceStatus</d:AcceptedSubscribeStatus>
    <d:ExpirationDate>2006-10-7T17:30:00:000Z</d:ExpirationDate>
  </d:SubscribeStatusInfomationResponse>                                       803
 </s:Body>
</s:Envelope>
```

FIG. 9

```
<s:Envelope
  xmlns:a="http://schemas.xmlsoap.org/ws/2004/08/addressing"
  xmlns:d="http://schemas.xmlsoap.org/ws/2005/04/discovery"
  xmlns:i="http://printer.example.org/2003/imaging"
  xmlns:s="http://www.w3.org/2003/05/soap envelope">
<s:Header>
  <a:Action>
    http://schemas.xmlsoap.org/ws/2005/04/discovery/
UpdateSubscribeStatusInfomationResponse
  </a:Action>
  <a:MessageID>
    uuid:0a6dc791-2be6-4991-9af1-454778a1917a
  </a:MessageID>
  <a:To>urn:schemas-xmlsoap-orgws:2005:04:discovery</a:To>
</s:Header>
<s:Body>
  <d:UpdateSubscribeStatusInfomationResponse>
    <d:Type>XXServiceServer</d:Type>                                901  902
    <d:AcceptedSubscribeStatus>XXServiceStatus</d:AcceptedSubscribeStatus>
    <d:ExpirationDate>2006-10-7T17:30:00:000Z</d:ExpirationDate>
  </d:UpdateSubscribeStatusInfomationResponse>
</s:Body>                                                                903
</s:Envelope>
```

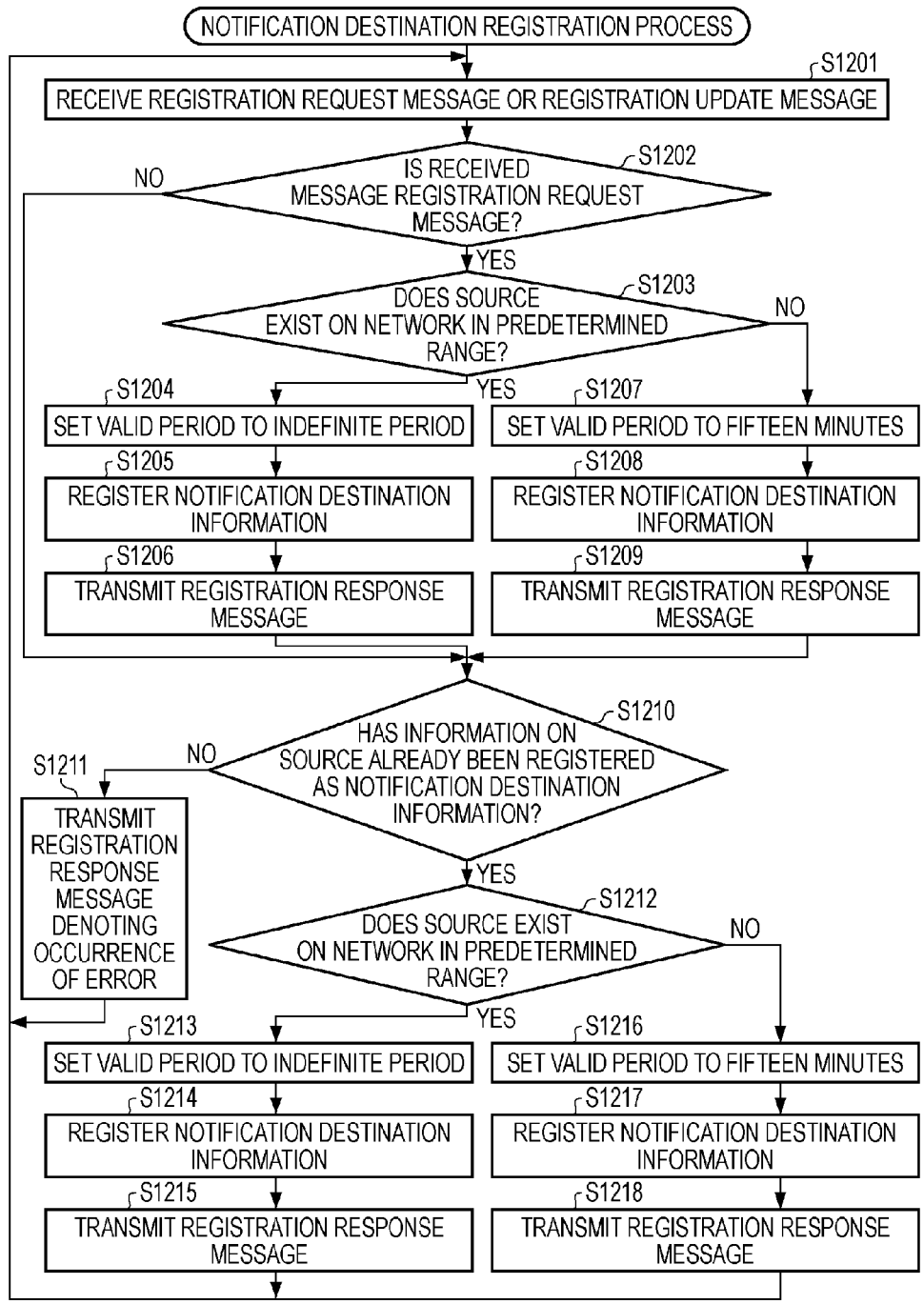

INFORMATION-PROCESSING APPARATUS, INFORMATION-PROCESSING METHOD, AND PROGRAM

BACKGROUND OF THE INVENTION

1. Field of the Invention

The present invention relates to an information-processing apparatus that transmits information thereabout to a predetermined notification destination.

2. Description of the Related Art

Information-processing apparatuses can receive from an external apparatus a registration request to register the external apparatus as a notification destination of information about the information-processing apparatus, and transmit information thereabout to the registered notification destination (for example, Japanese Patent Laid-Open Nos. 11-203094 and 2000-137585).

After the information-processing apparatus has registered the external apparatus as a notification destination of information thereabout in response to the registration request transmitted from the external apparatus, the registered notification destination information is sometimes deleted when the information-processing apparatus is restarted. In this case, after the information-processing apparatus has been restarted, the information-processing apparatus transmits information indicating that it has been restarted to the external apparatus. Upon receiving the information indicating that the information-processing apparatus has been restarted, the external apparatus retransmits a registration request to the information-processing apparatus.

However, the information indicating that the information-processing apparatus has been restarted is not always received by the external apparatus. According to circumstances, the external apparatus may not be able to receive the information and retransmit a registration request. For example, if multicast transmission of the information indicating that the information-processing apparatus has been restarted is performed, the information is sometimes blocked by a router and is not received by an external apparatus existing on a network located beyond the router.

In such a case, the external apparatus incapable of receiving the information indicating that the information-processing apparatus has been restarted does not retransmit a registration request, because it determines that the previously transmitted registration request has already been received by the information-processing apparatus. In reality, the notification destination information registered in response to the previously transmitted registration request has been deleted. Accordingly, information about the information-processing apparatus will not be transmitted to the external apparatus. In order to prevent such a case, it is desirable that an external apparatus can retransmit a registration request at the right time.

If a period of time during which notification destination information remains registered (a valid period of registration of notification destination information) is fixed, all external apparatuses that need information about an information-processing apparatus transmit a registration request to the information-processing apparatus before the valid period expires. That is, both of an external apparatus incapable of receiving information indicating that the information-processing apparatus has been restarted and an external apparatus capable of receiving the information transmit a registration request before the valid period expires. However, in the case of the external apparatus capable of receiving the information indicating that the information-processing apparatus has been restarted, even though the external apparatus can receive the information, it must transmit a registration request before the valid period expires. Consequently, the number of transmissions of a registration request is increased.

SUMMARY OF THE INVENTION

An information-processing apparatus according to an embodiment of the present invention includes: a storage unit configured to store a piece of notification destination information on a notification destination to which a piece of information on the information-processing apparatus is to be transmitted; a notification unit configured to transmit a piece of information on the information-processing apparatus to a notification destination indicated by the notification destination information stored in the storage unit; a receiving unit configured to receive from an external apparatus a registration request requesting registration of a piece of information on the external apparatus as a piece of notification destination information in the storage unit; and a time information notification unit configured to transmit a piece of first time information that denotes a valid period of registration of a piece of notification destination information to a source of a registration request received by the receiving unit when the source exists on a network in a predetermined range, and transmit a piece of second time information that denotes a valid period of registration of a piece of notification destination information to a source of a registration request received by the receiving unit when the source does not exist on the network in a predetermined range, a period of time indicated by the second time information being shorter than a period of time indicated by the first time information.

An information-processing apparatus according to an embodiment of the present invention includes: a storage unit configured to store a piece of notification destination information on a notification destination to which a piece of information on the information-processing apparatus is to be transmitted; a notification unit configured to transmit a piece of information on the information-processing apparatus to a notification destination indicated by the notification destination information stored in the storage unit; a receiving unit configured to receive from an external apparatus a registration request requesting registration of a piece of information on the external apparatus as a piece of notification destination information in the storage unit; and a time information notification unit configured to transmit to a source of a registration request received by the receiving unit a piece of first time information that denotes a valid period of registration of a piece of information on a notification destination that should be registered in response to the registration request when the notification destination exists on a network in a predetermined range, and transmit to a source of a registration request received by the receiving unit a piece of second time information that denotes a valid period of registration of a piece of information on a notification destination that should be registered in response to the registration request when the notification destination does not exist on the network in a predetermined range, a period of time indicated by the second time information being shorter than a period of time indicated by the first time information.

An information-processing apparatus according to an embodiment of the present invention includes: a storage unit configured to store a piece of notification destination information on a notification destination to which a piece of information on the information-processing apparatus is to be transmitted; a notification unit configured to transmit a piece of information on the information-processing apparatus to a notification destination indicated by the notification destination information stored in the storage unit; a receiving unit configured to receive from an external apparatus a registration request requesting registration of a piece of information on the external apparatus as a piece of notification destination information in the storage unit; and a time information notification unit configured to transmit to a source of a registration request received by the receiving unit a piece of time information indicating that a valid period of registration of a piece of notification destination information is a predetermined period of time when the source does not exist on a network in a predetermined range, and configured not to transmit to a source of a registration request received by the receiving unit the time information indicating that a valid period of registration of a piece of notification destination information is a predetermined period of time when the source exists on the network in a predetermined range.

An information-processing apparatus according to an embodiment of the present invention includes: a storage unit configured to store a piece of notification destination information on a notification destination to which a piece of information on the information-processing apparatus is to be transmitted; a notification unit configured to transmit a piece of information on the information-processing apparatus to a notification destination indicated by the notification destination information stored in the storage unit; a receiving unit configured to receive from an external apparatus a registration request requesting registration of a piece of information on the external apparatus as a piece of notification destination information in the storage unit; and a time information notification unit configured to transmit to a source of a registration request received by the receiving unit a piece of time information indicating that a valid period of registration of a piece of information on a notification destination that should be registered in response to the registration request is a predetermined period of time when the notification destination does not exist on a network in a predetermined range, and configured not to transmit to a source of a registration request received by the receiving unit the time information indicating that a valid period of registration of a piece of information on a notification destination that should be registered in response to the registration request is a predetermined period of time when the notification destination exists on the network in a predetermined range.

An information-processing method according to an embodiment of the present invention is performed in an information-processing apparatus. The information-processing method includes the steps of: storing a piece of notification destination information on a notification destination to which a piece of information on the information-processing apparatus is to be transmitted; transmitting a piece of information on the information-processing apparatus to a notification destination indicated by the stored notification destination information; receiving from an external apparatus a registration request requesting registration of a piece of information on the external apparatus as a piece of notification destination information; transmitting a piece of first time information that denotes a valid period of registration of a piece of notification destination information to a source of a received registration request when the source exists on a network in a predetermined range; and transmitting a piece of second time information that denotes a valid period of registration of a piece of notification destination information to a source of a received registration request when the source does not exist on the network in a predetermined range. A period of time indicated by the second time information is shorter than a period of time indicated by the first time information.

An information-processing method according to an embodiment of the present invention is performed in an information-processing apparatus. The information-processing method includes the steps of: storing a piece of notification destination information on a notification destination to which a piece of information on the information-processing apparatus is to be transmitted; transmitting a piece of information on the information-processing apparatus to a notification destination indicated by the stored notification destination information; receiving from an external apparatus a registration request requesting registration of a piece of information on the external apparatus as a piece of notification destination information; transmitting to a source of a received registration request a piece of first time information that denotes a valid period of registration of a piece of information on a notification destination that should be registered in response to the registration request when the notification destination exists on a network in a predetermined range; and transmitting to a source of a received registration request a piece of second time information that denotes a valid period of registration of a piece of information on a notification destination that should be registered in response to the registration request when the notification destination does not exist on the network in a predetermined range. A period of time indicated by the second time information is shorter than a period of time indicated by the first time information.

A computer readable program according to an embodiment of the present invention causes a computer to perform an information-processing method. The information-processing apparatus includes the steps of: storing a piece of notification destination information on a notification destination to which a piece of information on the information-processing apparatus is to be transmitted; transmitting a piece of information on the information-processing apparatus to a notification destination indicated by the stored notification destination information; receiving from an external apparatus a registration request requesting registration of a piece of information on the external apparatus as a piece of notification destination information; transmitting a piece of first time information that denotes a valid period of registration of a piece of notification destination information to a source of a received registration request when the source exists on a network in a predetermined range; and transmitting a piece of second time information that denotes a valid period of registration of a piece of notification destination information to a source of a received registration request when the source does not exist on the network in a predetermined range. A period of time indicated by the second time information is shorter than a period of time indicated by the first time information.

A computer readable program according to an embodiment of the present invention causes a computer to perform an information-processing method. The information-processing apparatus includes the steps of: storing a piece of notification destination information on a notification destination to which a piece of information on the information-processing apparatus is to be transmitted; transmitting a piece of information on the information-processing apparatus to a notification destination indicated by the stored notification destination information; receiving from an external apparatus a registration request requesting registration of a piece of information on the external apparatus as a piece of notification destination information; transmitting to a source of a received registration request a piece of first time information that denotes a valid period of registration of a piece of information on a notification destination that should be registered in response to the registration request when the notification destination exists on a network in a predetermined range; and transmitting to a source of a received registration request a piece of second time information that denotes a valid period of registration of a piece of information on a notification destination that should be registered in response to the registration request when the notification destination does not exist on the network in a predetermined range. A period of time indicated by the second time information is shorter than a period of time indicated by the first time information.

Further features of the present invention will become apparent from the following description of exemplary embodiments with reference to the attached drawings.

BRIEF DESCRIPTION OF THE DRAWINGS

FIG. 3 is a diagram illustrating a software configuration of a client apparatus.

FIG. 4 is a diagram illustrating a software configuration of a server apparatus.

FIG. 6 is a diagram illustrating an example of a registration request message.

FIG. 8 is a diagram illustrating an example of a registration response message.

FIG. 9 is a diagram illustrating an example of a registration response message.

FIG. 12 is a flowchart illustrating an exemplary notification destination registration process performed by a state information notification unit.

DESCRIPTION OF THE EMBODIMENTS

Exemplary embodiments of the present invention will now be described in detail with reference to the accompanying drawings. It should be noted that the exemplary embodiments below do not limit the present invention set forth in the claims and that not all of the combinations of features described in the exemplary embodiments are necessarily essential as means for attaining the objects of the invention.

First Embodiment

Figure 1:
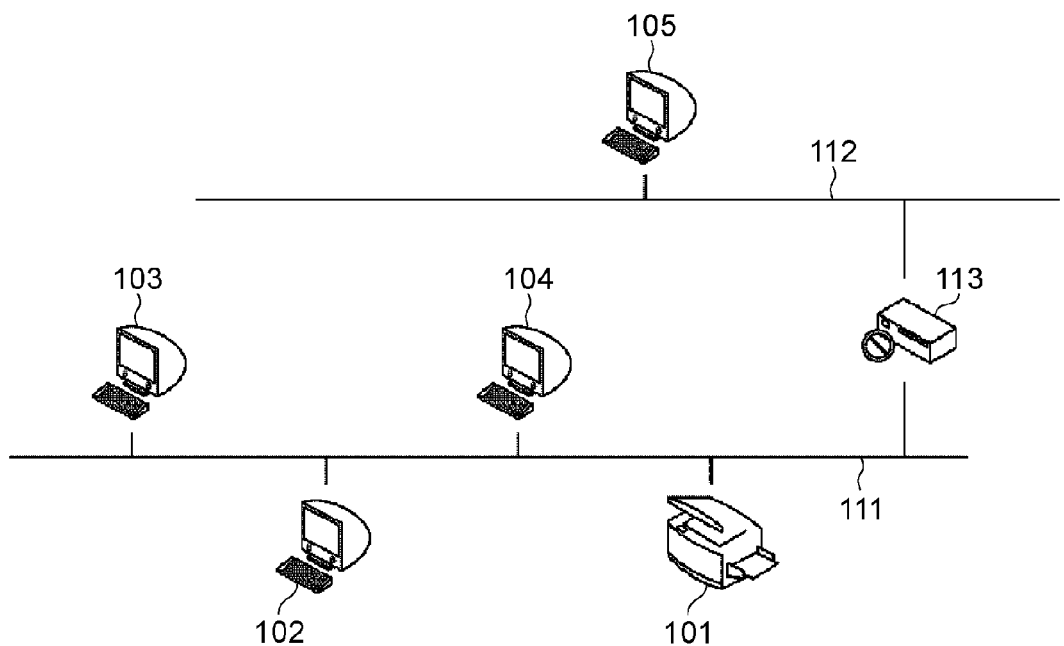
FIG. 1 is a diagram illustrating a system configuration.

FIG. 1 is a diagram illustrating a system configuration. A server apparatus 101 and client apparatuses 102, 103, and 104 are connected to a network 111. A client apparatus 105 is connected to a network 112. A router 113 connects the network 111 and the network 112 with each other.

Each of the client apparatuses 102 to 105 needs information about the state of the server apparatus 101 (hereinafter referred to as state information), and requests the server apparatus 101 to transmit notification of the state information thereto. At that time, information about the client apparatus is registered in a notification destination management table included in the server apparatus 101 as information about a notification destination of the state information (hereinafter referred to as notification destination information). That is, each of the client apparatuses 102 to 105 transmits a registration request packet for requesting registration of notification destination information to the server apparatus 101. The server apparatus 101 registers notification destination information in the notification destination management table in response to the registration request packet.

The client apparatuses 102 to 104 connected to the network 111 can receive a multicast packet from the server apparatus 101. Accordingly, each of the client apparatuses 102 to 104 acquires the IP address of the server apparatus 101 on the basis of a received multicast packet indicating that the server apparatus 101 has been started, and transmits a registration request packet using the acquired IP address.

A multicast packet may not be able to be transmitted beyond the router 113. Accordingly, the client apparatus 105 cannot receive the multicast packet from the server apparatus 101. In this case, a user specifies the IP address of the server apparatus 101, and the client apparatus 105 transmits a registration request packet using the IP address specified by the user.

Figure 2:
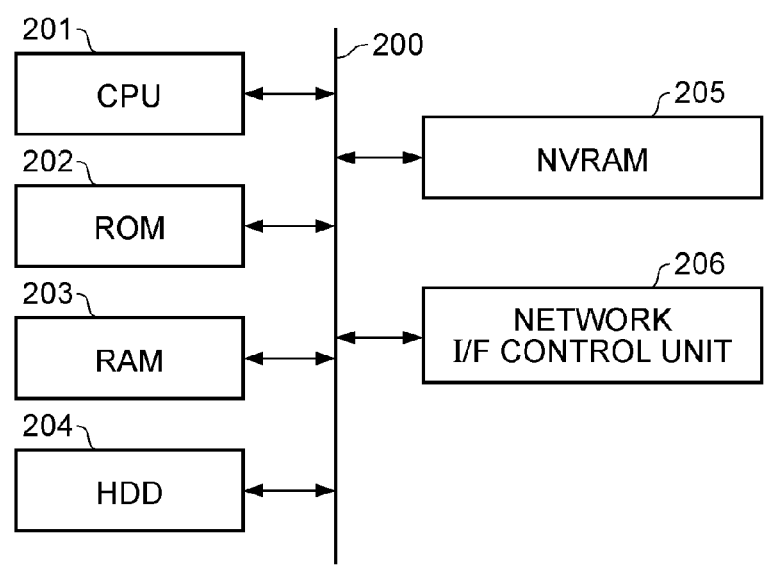
FIG. 2 is a diagram illustrating a hardware configuration of an information-processing apparatus such as a server apparatus or a client apparatus.

FIG. 2 is a diagram illustrating a hardware configuration of an information-processing apparatus such as the server apparatus 101, the client apparatus 102, the client apparatus 103, the client apparatus 104, or the client apparatus 105. An example of the server apparatus 101 is a printer, a copier, a multifunction machine, or a facsimile machine. If the server apparatus 101 is a printer, a printer engine is required in addition to components illustrated in FIG. 2.

Referring to FIG. 2, a CPU 201 controls the whole of the information-processing apparatus in accordance with a program for controlling a server apparatus or a client apparatus. A ROM 202 that is a read-only memory stores a boot program for the information-processing apparatus, a control program for controlling the information-processing apparatus, a fixed parameter for the information-processing apparatus, etc. A RAM 203 that is a random access memory stores data which the CPU 201 temporarily uses to control the whole of the information-processing apparatus. A notification destination management table is included in the RAM 203, and notification destination information is stored on the RAM 203.

An HDD 204 is a hard disk drive. In a server apparatus, a service program for controlling a service provided by the server apparatus and data associated with the service are stored in the HDD 204. In a client apparatus, a client program used to receive a service from a server apparatus and state information received from the server apparatus are stored in the HDD 204. An NVRAM 205 that is a nonvolatile memory stores various setting values for the information-processing apparatus.

A network interface control unit 206 is connected to the network 111 or the network 112, and controls data transmission and data receiving via the network. A bus 200 is a system bus connected to the CPU 201, the ROM 202, the RAM 203, the HDD 204, the NVRAM 205, and the network interface control unit 206, and allows a control signal or a data signal to be transferred among them.

FIG. 3 is a diagram illustrating a software configuration of each of the client apparatuses 102 to 105.

A startup notification control unit 301 controls the generation and transmission of a startup notification message indicating that the client apparatus has been started, and controls the acquisition of a startup notification message indicating that the server apparatus 101 has been started. When the startup notification control unit 301 calls a SOAP control unit 303, the SOAP control unit 303 generates a startup notification message in the SOAP/XML format in response to a request transmitted from the startup notification control unit 301. When the SOAP control unit 303 calls a TCP/IP control unit 306, the TCP/IP control unit 306 converts the SOAP/XML startup notification message into a UDP packet.

Upon receiving a UDP packet indicating that the server apparatus 101 has been started (hereinafter referred to as a startup notification packet), the TCP/IP control unit 306 extracts a SOAP/XML startup notification message from the startup notification packet, and transmits the extracted startup notification message to the SOAP control unit 303. The SOAP control unit 303 converts the SOAP/XML startup notification message into a startup notification message in a format understandable by the startup notification control unit 301, and transmits the converted startup notification message to the startup notification control unit 301. The startup notification control unit 301 notifies a state information acquisition unit 302 that it has received notification indicating that the server apparatus 101 has been started.

The state information acquisition unit 302 controls the generation and transmission of a registration request message for requesting the server apparatus 101 to register notification destination information, controls the reception and analysis of a registration response message transmitted from the server apparatus 101, and controls the reception and analysis of a state notification message that denotes the state of the server apparatus 101.

When the state information acquisition unit 302 is notified that the startup notification control unit 301 has received notification indicating that the server apparatus 101 has been started, the state information acquisition unit 302 calls the SOAP control unit 303 so as to request the SOAP control unit 303 to generate a registration request message. The SOAP control unit 303 generates a registration request message in the SOAP/XML format in response to a request transmitted from the state information acquisition unit 302, and calls an HTTP control unit 304. The HTTP control unit 304 transmits the registration request message to the server apparatus 101 using HTTP (Hyper Text Transfer Protocol). That is, in this process, the registration request message is converted into a TCP/IP packet by the TCP/IP control unit 306, and the TCP/IP packet is transmitted to the server apparatus 101 as a registration request packet.

When the TCP/IP control unit 306 receives a registration response packet that has been transmitted in response to a registration request packet, a SOAP/XML registration response message is transmitted from the HTTP control unit 304 to the SOAP control unit 303. The SOAP control unit 303 converts the SOAP/XML registration response message into a registration response message in a format understandable by the state information acquisition unit 302, and transmits the converted registration response message to the state information acquisition unit 302. The state information acquisition unit 302 analyzes the registration response message, and determines whether a period of time during which notification destination information remains registered (hereinafter referred to as a valid period of registration of notification destination information) is set. If it is determined that a valid period of registration of notification destination information is set, the state information acquisition unit 302 activates a timer so as to cause the timer to count down the remaining period of time before the valid period expires. When the remaining period of time indicated by the timer reaches a predetermined period of time, the state information acquisition unit 302 controls the generation and transmission of a registration update message. A registration update message is generated in the same manner as that for a registration request message, and is then transmitted to the server apparatus 101 as a registration update packet.

When the state of the server apparatus 101 is changed, the server apparatus 101 transmits a state notification message using HTTP. When the TCP/IP control unit 306 receives a state notification packet that denotes the state of the server apparatus 101, a SOAP/XML state notification message is transmitted from the HTTP control unit 304 to the SOAP control unit 303. The SOAP control unit 303 converts the SOAP/XML state notification message into a state notification message in a format understandable by the state information acquisition unit 302, and transmits the converted state notification message to the state information acquisition unit 302. The state information acquisition unit 302 analyzes the transmitted state notification message so as to acquire the state information that denotes the state of the server apparatus 101.

The SOAP control unit 303 converts data transmitted from the startup notification control unit 301 or the state information acquisition unit 302 into a SOAP/XML message in response to a request transmitted from the startup notification control unit 301 or the state information acquisition unit 302. Furthermore, the SOAP control unit 303 converts a SOAP/XML message into a message in a format understandable by the startup notification control unit 301 or the state information acquisition unit 302.

For the transmission and reception of a message, one of the following communication methods is used: the HTTP communication method in which the transmission and reception of a message is performed via the HTTP control unit 304 and the TCP/IP control unit 306 in accordance with HTTP; and the multicast communication method in which the transmission and reception of a message is performed via the TCP/IP control unit 306 using a UDP packet.

The HTTP control unit 304 performs HTTP communication. When encrypted communication is required, the HTTP control unit 304 performs SSL communication in accordance with HTTP via an SSL communication control unit 305. The SSL communication control unit 305 enables SSL communication.

The TCP/IP control unit 306 transmits or receives a TCP/IP packet or a UDP packet via a network communication driver 307 so as to perform communication in accordance with TCP/IP or UDP. The network communication driver 307 is software used to control the network interface control unit 206.

FIG. 4 is a diagram illustrating a software configuration of the server apparatus 101.

A startup notification control unit 401 controls the generation and transmission of a startup notification message indicating that the server apparatus 101 has been started, and controls the acquisition of a startup notification message indicating that a client apparatus has been started. When the startup notification control unit 401 calls a SOAP control unit 404, the SOAP control unit 404 generates a startup notification message in the SOAP/XML format in response to a request transmitted from the startup notification control unit 401. When the SOAP control unit 404 calls a TCP/IP control unit 407, the TCP/IP control unit 407 converts the SOAP/XML startup notification message into a UDP packet.

Upon receiving a UDP packet indicating that a client apparatus has been started (hereinafter referred to as a startup notification packet), the TCP/IP control unit 407 extracts a SOAP/XML startup notification message from the startup notification packet, and transmits the extracted startup notification message to the SOAP control unit 404. The SOAP control unit 404 converts the SOAP/XML startup notification message into a startup notification message in a format understandable by the startup notification control unit 401, and transmits the converted startup notification message to the startup notification control unit 401.

A state information notification unit 402 controls the reception of a registration request message, controls the generation and transmission of a registration response message, and controls the generation and transmission of a state notification message.

Upon receiving a registration request message, the state information notification unit 402 registers the IP address of the source of the registration request message in a notification destination management table 403 as notification destination information. When the TCP/IP control unit 407 receives a registration request packet, a SOAP/XML registration request message is transmitted from an HTTP control unit 405 to the SOAP control unit 404. The SOAP control unit 404 converts the SOAP/XML registration request message into a registration request message in a format understandable by the state information notification unit 402, and transmits the converted registration request message to the state information notification unit 402. The state information notification unit 402 analyzes the transmitted registration request message so as to check the IP address of the source of the registration request message and the type of state information that should be transmitted to the source. Subsequently, the state information notification unit 402 registers the IP address of the source in the notification destination management table 403 as notification destination information, and also registers information used to identify the type of state information that should be transmitted to the source (hereinafter referred to as state identification information) in the notification destination management table 403. The notification destination information and the state identification information are associated with each other and are then stored.

The state information notification unit 402 transmits a registration response message to a client apparatus, which is the source of the registration request message, in response to the registration request message. In order to generate the registration response message, the state information notification unit 402 sets the valid period of registration of notification destination information. A method of setting a valid period will be described later. Subsequently, the state information notification unit 402 calls the SOAP control unit 404, requests the SOAP control unit 404 to generate a registration response message, and notifies the SOAP control unit 404 of the valid period of registration of notification destination information. The SOAP control unit 404 generates a SOAP/XML registration response message in response to the request transmitted from the state information notification unit 402. This registration response message includes time information that denotes the valid period of registration of the notification destination information (hereinafter referred to as valid period information). When the SOAP control unit 404 calls the HTTP control unit 405, the HTTP control unit 405 transmits a registration response message to the client apparatus using HTTP (Hyper Text Transfer Protocol). That is, in this process, the registration response message is converted into a TCP/IP packet by the TCP/IP control unit 407, and the TCP/IP packet is transmitted to the client apparatus as a registration response packet.

When the state of the server apparatus 101 is changed, the server apparatus 101 transmits a state notification message to a client apparatus indicated by the notification destination information stored in the notification destination management table. However, if the type of the state change that has occurred in the server apparatus 101 does not correspond to state identification information, a state notification message is not transmitted to a client apparatus indicated by notification destination information associated with the state identification information.

The state information notification unit 402 calls the SOAP control unit 404, requests the SOAP control unit 404 to generate a state notification message, and notifies the SOAP control unit 404 of state information and notification destination information. The SOAP control unit 404 generates a SOAP/XML state notification message in response to the request transmitted from the state information notification unit 402. This state notification message includes the state information. Subsequently, the SOAP control unit 404 transmits the state notification message and the notification destination information to the HTTP control unit 405. The HTTP control unit 405 transmits a state notification message to a client apparatus indicated by the notification destination information using HTTP (Hyper Text Transfer Protocol). That is, in this process, the state information message is converted into a TCP/IP packet by the TCP/IP control unit 407, and the TCP/IP packet is transmitted to the client apparatus indicated by the notification destination information as a state notification packet.

The SOAP control unit 404 converts data transmitted from the startup notification control unit 401 or the state information notification unit 402 into a SOAP/XML message in response to a request transmitted from the startup notification control unit 401 or the state information notification unit 402. Furthermore, the SOAP control unit 404 converts a SOAP/XML message into a message in a format understandable by the startup notification control unit 401 or the state information notification unit 402.

For the transmission and reception of a message, one of the following communication methods is used: the HTTP communication method in which the transmission and reception of a message is performed via the HTTP control unit 405 and the TCP/IP control unit 407 in accordance with HTTP; and the multicast communication method in which the transmission and reception of a message is performed via the TCP/IP control unit 407 using a UDP packet.

The HTTP control unit 405 performs HTTP communication. When encrypted communication is required, the HTTP control unit 405 performs SSL communication in accordance with HTTP via an SSL communication control unit 406. The SSL communication control unit 406 enables SSL communication.

The TCP/IP control unit 407 transmits or receives a TCP/IP packet or a UDP packet via a network communication driver 408 so as to perform communication in accordance with TCP/IP or UDP. The network communication driver 408 is software used to control the network interface control unit 206.

Figure 5:
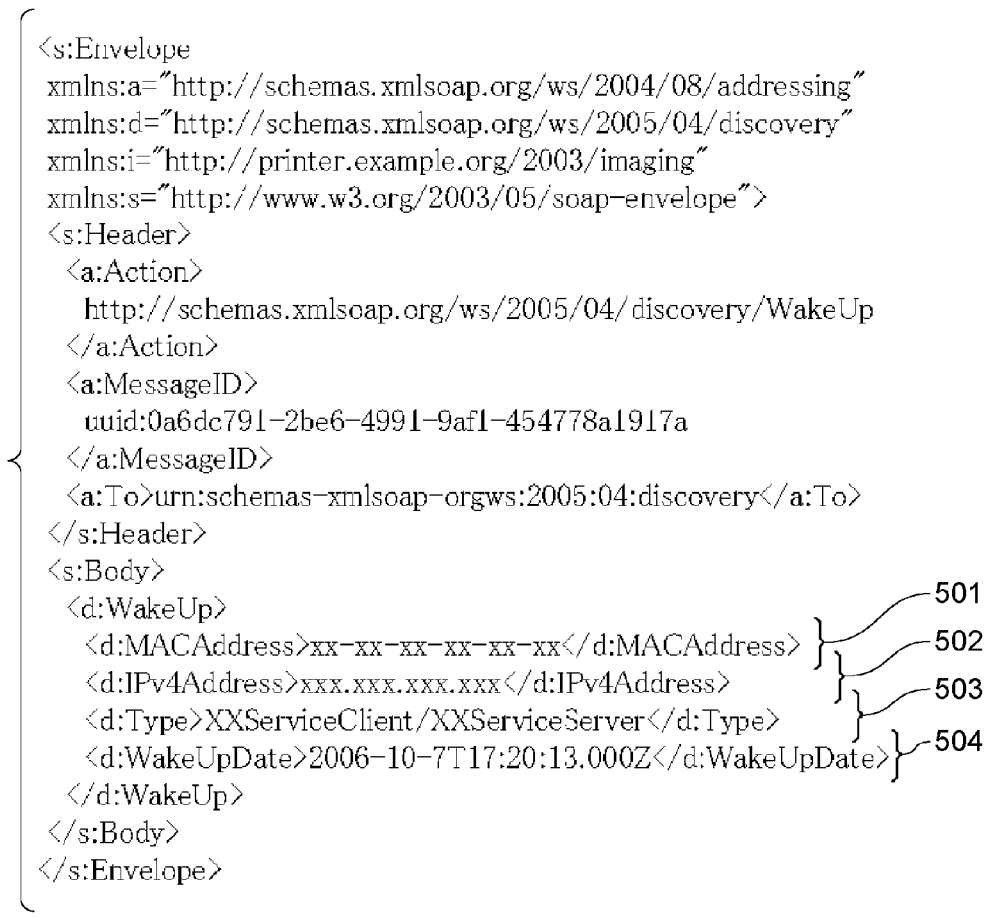
FIG. 5 is a diagram illustrating an example of a startup notification message.

FIG. 5 is a diagram illustrating an example of a startup notification message. This startup notification message includes a MAC (Media Access Control) address 501 used to uniquely specify the source of this startup notification message, an IP address 502 of the source of this startup notification message, type information 503 used to determine whether state information should be registered, and date and time information 504 denoting a date and time at which the source of this startup notification message was started.

FIG. 6 is a diagram illustrating an example of a registration request message. This registration request message includes a MAC address 601 of the source of this registration request message, an IP address 602 of the source of this registration request message, type information 603 indicating that the source of this registration request message is a client apparatus compatible with a server function provided by the server apparatus 101, state identification information 604 used to identify the type of state information that should be transmitted to the source of this registration request message, and date and time information 605 denoting a date and time at which this registration request message was generated.

Figure 7:
FIG. 7 is a diagram illustrating an example of a registration update message.

FIG. 7 is a diagram illustrating an example of a registration update message. Each of the client apparatuses 102 to 105 transmits a registration update message to the server apparatus 101 if it wants to extend the valid period of registration of notification destination information.

Upon receiving a registration update message, the server apparatus 101 extends the valid period of registration of corresponding notification destination information, and transmits a registration response message that denotes the extended valid period of registration of the notification destination information to a client apparatus that is the source of the registration update message.

This registration update message includes a MAC address 701 of the source of this registration update message, an IP address 702 of the source of this registration update message, type information 703 indicating that the source of this registration update message is a client apparatus compatible with a server function provided by the server apparatus 101, state identification information 704 used to identify the type of state information that should be transmitted to the source of this registration update message, and date and time information 705 denoting a date and time at which this registration update message was generated.

FIGS. 8 and 9 are diagrams illustrating an example of a registration response message. FIG. 8 illustrates an example of a registration response message that is generated in response to a registration request message. This registration response message illustrated in FIG. 8 includes type information 801 denoting details of service provided by the server apparatus 101 that has transmitted this registration response message, state identification information 802 used to identify the type of state information that should be transmitted to a client apparatus, and valid period information 803 that denotes the valid period of registration of notification destination information. If there is no valid period, the valid period information 803 is not included in this registration response message or the valid period information 803 has no data.

The valid period information may denote the expiration date and time at which the valid period of registration of notification destination information expires or the remaining period of time before the valid period of registration of notification destination information expires.

FIG. 9 illustrates an example of a registration response message that is generated in response to a registration update message. This registration response message illustrated in FIG. 9 includes type information 901 denoting details of service provided by the server apparatus 101 that has transmitted this registration response message, state identification information 902 used to identify the type of state information that should be transmitted to a client apparatus, and valid period information 903 that denotes the extended valid period of registration of notification destination information. If there is no valid period, the valid period information 903 is not included in this registration response message or the valid period information 903 has no data.

Figure 10:
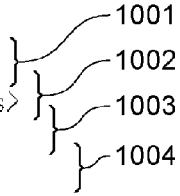
FIG. 10 is a diagram illustrating an example of a state notification message.

FIG. 10 is a diagram illustrating an example of a state notification message. This state notification message includes type information 1001 that denotes details of service provided by the server apparatus 101, state identification information 1002 that denotes the type of state information that will be transmitted from the server apparatus 101 to a client server, state information 1003 that denotes the state of the server apparatus 101, and reason information 1004 that denotes the reason why the server apparatus 101 is in a state indicated by the state information. For example, referring to an example illustrated in FIG. 10, the reason information 1004 indicates that the server apparatus 101 is in the busy state because the number of members who logged in the server apparatus 101 exceeds a predetermined number.

Figure 11:
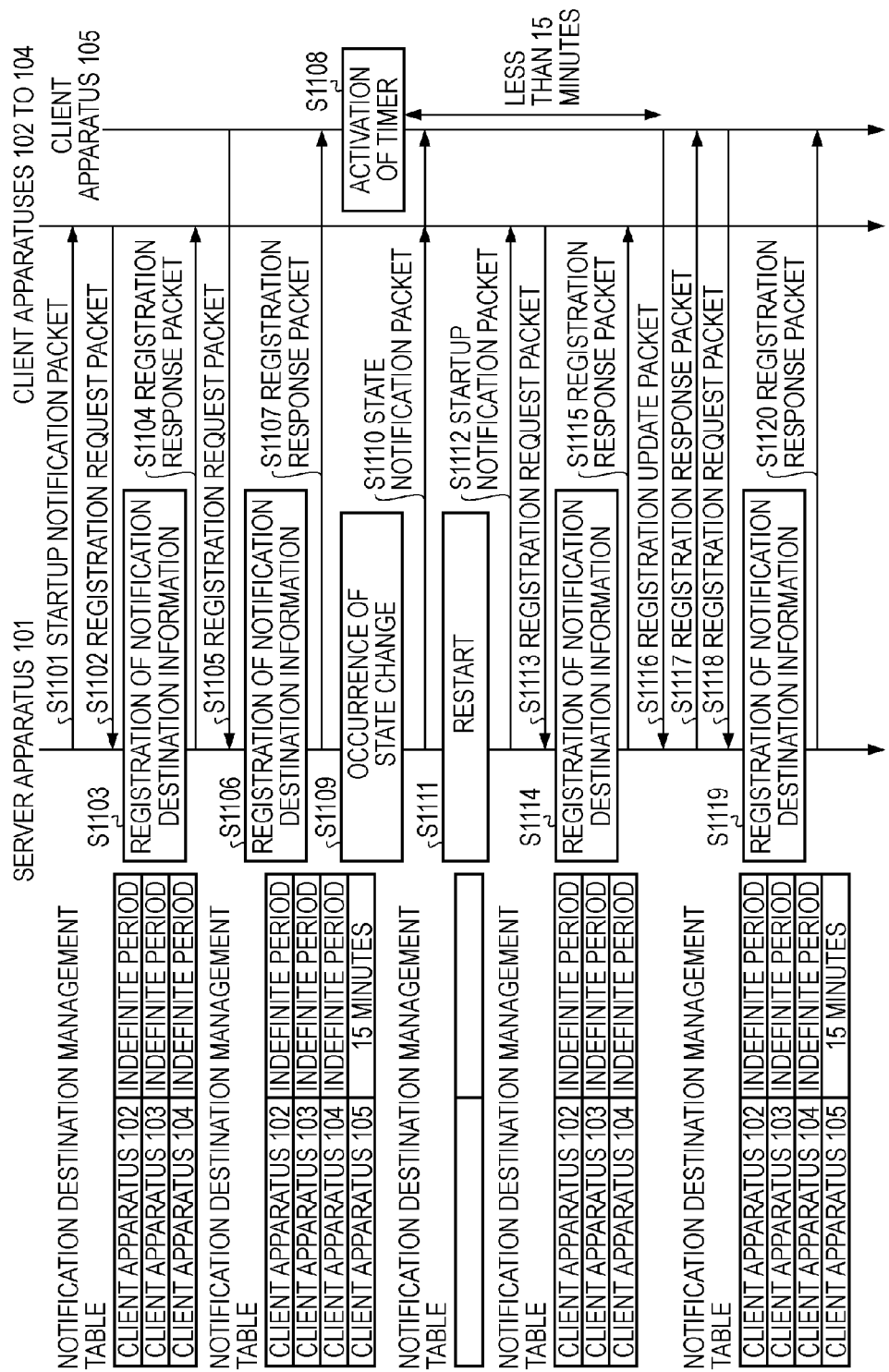
FIG. 11 is a sequence diagram illustrating an exemplary process of registering state information notification destinations.

FIG. 11 is a sequence diagram illustrating an exemplary process of registering state information notification destinations. FIG. 11 also illustrates changes in the contents of a notification destination management table.

In step S1101, the server apparatus 101 is started, and performs multicast transmission of a startup notification packet to a network in a predetermined range. In the case of an example illustrated in FIG. 1, a network in a predetermined range is the network 111 in which any apparatus connected to the network 111 can receive the startup notification packet.

In step S1102, each of the client apparatuses 102 to 104 connected to the network 111 checks the IP address of the source of the startup notification packet, and transmits a registration request packet to the server apparatus 101 using the IP address.

In step S1103, the server apparatus 101 checks the IP addresses of the sources of the registration request packets so as to determine whether client apparatuses that are the sources of the registration request packets exist on a network in a predetermined range. In the case of an example illustrated in FIG. 1, a network in a predetermined range is the network 111. If the client apparatuses that are the sources of the registration request packets exist on the network in a predetermined range, the server apparatus 101 sets the valid period of registration of notification destination information to an indefinite period, and registers, in the notification destination management table, notification destination information denoting the IP address of each of the sources and valid period information indicating that the valid period of registration of notification destination information is an indefinite period.

In step S1104, the server apparatus 101 transmits a registration response packet to each of the client apparatuses that are the sources of the registration request packets. This registration response packet includes the valid period information indicating that the valid period of registration of notification destination information is an indefinite period.

In step S1105, the client apparatus 105 transmits a registration request packet to the server apparatus 101. The client apparatus 105 cannot receive a startup notification packet, and therefore cannot know the IP address of the server apparatus 101 on the basis of the startup notification packet which the server apparatus 101 has transmitted. Accordingly, a user specifies the IP address of the server apparatus 101, and the client apparatus 105 transmits a registration request packet to the server apparatus 101 using the IP address specified by the user.

In step S1106, the server apparatus 101 checks the IP address of the source of the registration request packet so as to determine whether a client apparatus that is the source of the registration request packet exist on the network in a predetermined range. In the case of an example illustrated in FIG. 1, a network in a predetermined range is the network 111. If the client apparatus that is the source of the registration request packet does not exist on the network in a predetermined range, the server apparatus 101 sets the valid period of registration of notification destination information to fifteen minutes, and registers, in the notification destination management table, notification destination information denoting the IP address of the source and valid period information indicating that the valid period of registration of notification destination information is fifteen minutes.

In step S1107, the server apparatus 101 transmits a registration response packet to the client apparatus that is the source of the registration request packet. This registration response packet includes the valid period information indicating that the valid period of registration of notification destination information is fifteen minutes.

The client apparatus 105 receives the registration response packet including the valid period information indicating that the valid period of registration of notification destination information is not an indefinite period. Accordingly, the client apparatus 105 is required to update the valid period of registration of notification destination information before the valid period expires. Accordingly, in step S1108, the client apparatus 105 checks a period of time indicated by the valid period information included in the registration response packet, and activates its internal timer.

If the state of the server apparatus 101 is changed in step S1109, the server apparatus 101 transmits a state notification packet to each of notification destinations that are individually indicated by the pieces of notification destination information registered in the notification destination management table in step S1110.

In step S1111, the server apparatus 101 is restarted for some reason. Consequently, all pieces of information stored in the notification destination management table are lost.

After the server apparatus 101 has been restarted, the server apparatus 101 performs multicast transmission of a startup notification packet to the network in the predetermined range again in step S1112.

Subsequently, a registration request packet is retransmitted in response to the startup notification packet, and then notification destination information is registered in the notification destination management table. In step S1113, each of the client apparatuses 102 to 104 retransmits a registration request packet to the server apparatus 101. The client apparatuses 102 to 104 exist on the network in the predetermined range. Accordingly, in step S1114, the server apparatus 101 sets the valid period of registration of notification destination information to an indefinite period, and registers, in the notification destination management table, notification destination information denoting the IP address of each of the sources of the registration request packets and valid period information indicating that the valid period of registration of notification destination information is an indefinite period. In step S1115, the server apparatus 101 transmits a registration response packet to each of the client apparatuses 102 to 104. This registration response packet includes the valid period information indicating that the valid period of registration of notification destination information is an indefinite period.

On the other hand, the client apparatus 105 connected to the network 112 does not receive the startup notification packet transmitted in step S1112, and therefore cannot detect the restart of the server apparatus 101. However, in the case of the client apparatus 105, the valid period of registration of notification destination information has been set to fifteen minutes in step S1105. Accordingly, a registration update packet is transmitted before the valid period expires. In step S1116, the client apparatus 105 transmits a registration update packet to the server apparatus 101 when the time indicated by the internal timer thereof reaches a predetermined time less than fifteen minutes (for example, fourteen minutes).

The server apparatus 101 receives the registration update packet from the client apparatus 105. However, in reality, the IP address of the client apparatus 105 is not registered in the notification destination management table as notification destination information. Accordingly, in step S1117, the server apparatus 101 transmits a registration response packet that denotes the occurrence of an error to the client apparatus 105.

Upon receiving the registration response packet that denotes the occurrence of an error, the client apparatus 105 determines that the update of the valid period has failed, and knows that notification destination information is not registered. Accordingly, in step S1118, the client apparatus 105 retransmits a registration request packet to the server apparatus 101.

In step S1119, the server apparatus 101 checks the IP address of the source of the registration request packet transmitted from the client apparatus 105 so as to determine whether a client apparatus that is the source of the registration request packet exists on the network in the predetermined range. The client apparatus 105 does not exist on the network in the predetermined range. Accordingly, the server apparatus 101 sets the valid period of registration of notification destination information to fifteen minutes, and registers, in the notification destination management table, notification destination information denoting the IP address of the source and valid period information indicating that the valid period of registration of notification destination information is fifteen minutes. In step S1120, the server apparatus 101 transmits a registration response packet to the client apparatus 105.

Thus, even if a startup notification packet is not transmitted to the client apparatus 105 after the server apparatus 101 has been restarted, the client apparatus 105 can request the server apparatus 101 to reregister the client apparatus 105 as a notification destination.

FIG. 12 is a flowchart showing an exemplary notification destination registration process performed by the state information notification unit 402 included in the server apparatus 101. The CPU 201 included in the server apparatus 101 executes a program based on the flowchart shown in FIG. 12, whereby the notification destination registration process is performed.

In step S1201, the state information notification unit 402 receives a registration request message or a registration update message from a client apparatus. In step S1202, the state information notification unit 402 determines which one of a registration request message and a registration update message has been received. If the state information notification unit 402 determines that it has received a registration request message, the process proceeds to step S1203. On the other hand, if the state information notification unit 402 determines that it has received a registration update message, the process proceeds to step S1210.

In step S1203, the state information notification unit 402 determines whether a client apparatus that is the source of the registration request message exists on a network in a predetermined range.

In the case of an example illustrated in FIG. 1, the network in a predetermined range is the network 111. The IP address of the source, the IP address of the server apparatus 101, and a subnet mask are used to determine whether the source of the registration request message exists on the network in a predetermined range. The state information notification unit 402 determines whether a subnetwork to which the IP address of the source belongs and a subnetwork to which the IP address of the server apparatus 101 belongs are the same on the basis of the subnet mask. For example, it is assumed that the IP address of the source is "192.168.1.3", the IP address of the server apparatus 101 is "192.168.1.4", and the subnet mask is "255.255.255.0". In this case, subnetworks to which the IP addresses of the source and the server apparatus 101 belong are the same. On the other hand, it is assumed that the IP address of the source is "192.168.2.3", the IP address of the server apparatus 101 is "192.168.1.4", and the subnet mask is "255.255.255.0". In this case, the address of a subnetwork to which the IP address of the source belongs becomes "192.168.2.0" and the address of a subnetwork to which the IP address of the server apparatus 101 belongs becomes "192.168.1.0". That is, subnetworks to which the IP addresses of the source and the server apparatus 101 belong are different from each other.

If it is determined in step S1203 that the client apparatus, which is the source of the registration request message, exists on the network in a predetermined range, the process proceeds to step S1204. On the other hand, if it is determined in step S1203 that the client apparatus, which is the source of the registration request message, does not exist on the network in a predetermined range, the process proceeds to step S1207.

In step S1204, the state information notification unit 402 sets the valid period of registration of notification destination information to an indefinite period. Consequently, the number of transmissions of a registration request message can be reduced. In step S1205, the state information notification unit 402 registers, in a notification destination management table, notification destination information denoting the IP address of the source of the registration request message and valid period information indicating that the valid period of registration of the notification destination information is an indefinite period. In addition, state identification information is also registered in the notification destination management table.

In step S1206, the state information notification unit 402 performs control processing so that a registration response message including the valid period information in which the valid period is set to an indefinite period is transmitted to the client apparatus.

In step S1207, the state information notification unit 402 sets the valid period of registration of notification destination information to fifteen minutes. In step S1208, the state information notification unit 402 registers, in the notification destination management table, notification destination information denoting the IP address of the source of the registration request message and valid period information indicating that the valid period of registration of the notification destination information is fifteen minutes. In addition, state identification information is also registered in the notification destination management table. Here, the valid period of registration of notification destination information is not limited to the valid period of fifteen minutes, and may be the valid period of a predetermined time other than an indefinite period.

In step S1209, the state information notification unit 402 performs control processing so that a registration response message including the valid period information in which the valid period is set to fifteen minutes is transmitted to the client apparatus.

In step S1210, the state information notification unit 402 determines whether the IP address of the source of a registration update message has already been registered as notification destination information in the notification destination management table. If it is determined that the IP address of the source of the registration update message has already been registered in the notification destination management table, the process proceeds to step S1212. On the other hand, if it is determined that the IP address of the source of the registration update message has not been registered in the notification destination management table, the process proceeds to step S1211.

In step S1211, the state information notification unit 402 performs control processing so that a registration response message denoting the occurrence of an error is transmitted to the client apparatus.

In step S1212, the state information notification unit 402 determines whether the client apparatus that is the source of the registration update message exists on the network in a predetermined range. Here, the network in a predetermined range is the network 111.

If it is determined in step S1212 that the client apparatus that is the source of the registration update message exists on the network in a predetermined range, the process proceeds to step S1213. On the other hand, if it is determined in step S1212 that the client apparatus that is the source of the registration update message does not exist on the network in a predetermined range, the process proceeds to step S1216.

In step S1213, the state information notification unit 402 sets the valid period of registration of notification destination information to an indefinite period. In step 1214, the state information notification unit 402 reregisters, in the notification destination management table, notification destination information denoting the IP address of the source of the registration update message and valid period information indicating that the valid period of registration of the notification destination information is an indefinite period.

In step S1215, the state information notification unit 402 performs control processing so that a registration response message including the valid period information in which the valid period is set to an indefinite period is transmitted to the client apparatus.

In step S1216, the state information notification unit 402 sets the valid period of registration of notification destination information to fifteen minutes. In step S1217, the state information notification unit 402 reregisters, in the notification destination management table, notification destination information denoting the IP address of the source of the registration update message and valid period information indicating that the valid period of registration of the notification destination information is fifteen minutes. Here, the valid period of registration of notification destination information is not limited to the valid period of fifteen minutes, and may be the valid period of a predetermined time other than an indefinite period.

In step S1218, the state information notification unit 402 performs control processing so that a registration response message including the valid period information in which the valid period is set to fifteen minutes is transmitted to the client apparatus.

Second Embodiment

In the first embodiment, the server apparatus 101 registers the IP address of the source of a registration request message in the notification destination management table as notification destination information. However, a registration request message may include notification destination information, and the notification destination information included in the registration request message may be registered in the notification destination management table. In this case, in the notification destination registration process shown in FIG. 12, the state information notification unit 402 determines whether a notification destination indicated by notification destination information included in a registration request message exists on the network in a predetermined range.

In the first embodiment, the valid period of registration of notification destination information is set to an indefinite period in steps S1204 and S1213. However, the valid period of registration of notification destination information may be set to a period of time longer than the valid period set in step S1207 or S1216.

In the first embodiment, the network in a predetermined range is a subnetwork to which the server apparatus 101 belongs. However, according to network environments, if a multicast packet can be transmitted beyond a predetermined number of routers, a network in a range wider than the range of the subnetwork may be used.

In the first embodiment, the IP addresses of the server apparatus and the client apparatuses are used. However, another type of address may be used.

The present invention may be embodied as follows. A software program achieving the functions of the above-described embodiment is directly or remotely provided for a system or an apparatus and the provided program is read out and executed by a computer for the system or apparatus, whereby the present embodiment can be achieved. Instead of the software program, other forms may be used as long as they have the function of the program.

Accordingly, the present invention can also be embodied by a program code that is installed on a computer so as to cause the computer to achieve the functional processing of the present embodiment. That is, a computer program for achieving the functional processing of the present embodiment is included in the present invention. Instead of the computer program, other forms such as an object code, a program executed by an interpreter, and script data provided for an OS may be used as long as they have the function of the program.

As a recording medium for providing a program, for example, a floppy disk, a hard disk, an optical disc, a magneto-optical disk, an MO, a CD-ROM, a CD-R, a CD-RW, a magnetic tape, a nonvolatile memory card, a ROM, and a DVD (DVD-ROM or DVD-R) may be used.

A program may be provided by connecting a client computer to an Internet home page via the browser of the client computer, and downloading from the home page to a recording medium such as a hard disk a computer program according to an embodiment of the present invention or a compressed file that has an automatic installation function.

In addition, a program according to an embodiment of the present invention may be provided in such a manner that a program code configuring the program is divided into a plurality of files, and the divided files are individually downloaded from different home pages. That is, a WWW server that allows a plurality of users to download program files required for causing a computer to perform functional processing of the present invention is included in the present invention.

A program according to an embodiment of the present invention may be encrypted, be stored on a storage medium such as a CD-ROM, and then be provided to a user. If the user satisfies predetermined conditions, the user is allowed to download decryption key information from a home page via the Internet. The user executes the encrypted program using the downloaded decryption key information, and then installs the program on a computer.

When the computer executes the program, the functions of the above-described embodiment can be achieved. Furthermore, an OS or the like running on the computer may perform a part of or all of the processing in accordance with the instruction of the program, whereby the functions of the above-described embodiment can be achieved.

Still furthermore, the program read out from the recording medium may be written in a function expansion board inserted into a computer or in a memory provided for a function expansion unit connected to a computer. Subsequently, a CPU provided for the function expansion board or the function expansion unit performs a part of or all of the processing in accordance with the instruction of the program, whereby the functions of the above-described embodiment can be achieved.

Thus, the case can be prevented in which an apparatus requiring information about an information-processing apparatus is not registered as a notification destination by the information-processing apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-336006 filed Dec. 13, 2006, which is hereby incorporated by reference herein in its entirety.

What is claimed is:

1. An information-processing apparatus configured to transmit information on the information-processing apparatus to a notification destination specified by a request message, the apparatus comprising:
   a memory;
   a CPU;
   a receiving unit configured to receive from an external apparatus the request message requesting transmission of the information on the information-processing apparatus;
   a determination unit configured to determine, in a case where the receiving unit receives the request message, whether the external apparatus exists on a network in a specific range;
   a setting unit configured to set a valid period of the notification destination based on a result of determination by the determination unit; and
   a transmitting unit configured to transmit a response message including the valid period set by the setting unit to the external apparatus,
   wherein, in a case where the external apparatus does not exist on the network in the specific range, the determination unit sets the valid period of the notification destination to a predetermined period, wherein, in a case where the external apparatus exists on the network in the specific range, the determination unit sets the valid period of the notification destination to an indefinite period, and wherein the receiving unit, the determining unit, the setting unit, and the transmitting unit are implemented at least in part by the CPU executing at least one program recorded on the memory.

2. The information-processing apparatus according to claim 1, wherein the information-processing apparatus is a printing apparatus.

3. The information-processing apparatus according to claim 1, wherein the network in the specific range is a sub network on which the information-processing apparatus exists.

4. The information-processing apparatus according to claim 1,
wherein, in a case where the information-processing apparatus is activated, the information-processing apparatus transmits a startup notification message, and
wherein the network in the specific range matches a network where the startup notification message arrives.

5. An information-processing method for transmitting information on an information-processing apparatus to a notification destination specified by a request message, the method comprising:
receiving from an external apparatus the request message requesting transmission of the information on the information-processing apparatus;
determining, in a case where the receiving receives the request message, whether the external apparatus exists on a network in a specific range;
setting a valid period of the notification destination based on a result of determination by the determining; and
transmitting a response message including the valid period set by the setting to the external apparatus,
wherein, in a case where the external apparatus does not exist on the network in the specific range, setting the valid period of the notification destination to a predetermined period,
wherein, in a case where the external apparatus exists on the network in the specific range, setting the valid period of the notification destination to an indefinite period, and
wherein the receiving, the determining, the setting, and the transmitting are implemented at least in part by a CPU executing at least one program recorded on a memory.

6. The information-processing method according to claim 5, wherein the information-processing apparatus is a printing apparatus.

7. The information-processing method according to claim 5, wherein the network in the specific range is a sub network on which the information-processing apparatus exists.

8. The information-processing method according to claim 5,
wherein, in a case where the information-processing apparatus is activated, the information-processing apparatus transmits a startup notification message, and
wherein the network in the specific range matches a network where the startup notification message arrives.

9. A non-transitory computer readable storage medium which when loaded into a computer and executed causes the computer to perform an information-processing method for transmitting information on an information-processing apparatus to a notification destination specified by a request message, the method comprising:
receiving from an external apparatus the request message requesting transmission of the information on the information-processing apparatus;
determining, in a case where the receiving receives the request message, whether the external apparatus exists on a network in a specific range;
setting a valid period of the notification destination based on a result of determination by the determining; and
transmitting a response message including the valid period set by the setting to the external apparatus,
wherein, in a case where the external apparatus does not exist on the network in the specific range, setting the valid period of the notification destination to a predetermined period, and
wherein, in a case where the external apparatus exists on the network in the specific range, setting the valid period of the notification destination to an indefinite period,
wherein the receiving, the determining, the setting, and the transmitting are implemented at least in part by a CPU executing at least one program recorded on a memory.

10. The computer readable medium according to claim 9, wherein the information-processing apparatus is a printing apparatus.

11. The computer readable medium according to claim 9, wherein the network in the specific range is a sub network on which the information-processing apparatus exists.

12. The computer readable medium according to claim 9,
wherein, in a case where the information-processing apparatus is activated, the information-processing apparatus transmits a startup notification message, and
wherein the network in the specific range matches a network where the startup notification message arrives.

13. An information-processing apparatus configured to transmit information on the information-processing apparatus to a notification destination specified by a request message, the apparatus comprising:
a memory;
a CPU;
a receiving unit configured to receive from an external apparatus the request message requesting transmission of the information on the information-processing apparatus;
a determination unit configured to determine, in a case where the receiving unit receives the request message, whether the external apparatus exists on a network in a specific range;
a setting unit configured to set a valid period of the notification destination based on a result of determination by the determination unit; and
a transmitting unit configured to transmit a response message including the valid period set by the setting unit to the external apparatus,
wherein, in a case where the external apparatus does not exist on the network in the specific range, the determination unit sets the valid period of the notification destination to a first period,
wherein, in a case where the external apparatus exists on the network in the specific range, the determination unit sets the valid period of the notification destination to a second period which is longer than the first period, and
wherein the receiving unit, the determining unit, the setting unit, and the transmitting unit is implemented at least in part by the CPU executing at least one program recorded on the memory.

14. The information-processing apparatus according to claim 13, wherein the information-processing apparatus is a printing apparatus.

15. The information-processing apparatus according to claim 13, wherein the network in the specific range is a sub network on which the information-processing apparatus exists.

16. The information-processing apparatus according to claim 13,
wherein, in a case where the information-processing apparatus is activated, the information-processing apparatus transmits a startup notification message, and
wherein the network in the specific range matches a network where the startup notification message arrives.

17. An information-processing method for transmitting information on an information-processing apparatus to a notification destination specified by a request message, the method comprising:
receiving from an external apparatus the request message requesting transmission of the information on the information-processing apparatus;
determining, in a case where the receiving receives the request message, whether the external apparatus exists on a network in a specific range;
setting a valid period of the notification destination based on a result of determination by the determining; and
transmitting a response message including the valid period set by the setting to the external apparatus,
wherein, in a case where the external apparatus does not exist on the network in the specific range, the determination unit sets the valid period of the notification destination to a first period, and
wherein, in a case where the external apparatus exists on the network in the specific range, the determination unit sets the valid period of the notification destination to a second period which is longer than the first period,
wherein the receiving, the determining, the setting, and the transmitting are implemented at least in part by a CPU executing at least one program recorded on a memory.

18. The information-processing method according to claim 17, wherein the information-processing apparatus is a printing apparatus.

19. The information-processing method according to claim 17, wherein the network in the specific range is a sub network on which the information-processing apparatus exists.

20. The information-processing method according to claim 17,
wherein, in a case where the information-processing apparatus is activated, the information-processing apparatus transmits a startup notification message, and
wherein the network in the specific range matches a network where the startup notification message arrives.

21. A non-transitory computer readable storage medium which when loaded into a computer and executed causes the computer to perform an information-processing method for transmitting information on an information-processing apparatus to a notification destination specified by a request message, the method comprising:
receiving from an external apparatus the request message requesting transmission of the information on the information-processing apparatus;
determining, in a case where the receiving receives the request message, whether the external apparatus exists on a network in a specific range;
setting a valid period of the notification destination based on a result of determination by the determining; and
transmitting a response message including the valid period set by the setting to the external apparatus,
wherein, in a case where the external apparatus does not exist on the network in the specific range, the determination unit sets the valid period of the notification destination to a first period, and
wherein, in a case where the external apparatus exists on the network in the specific range, the determination unit sets the valid period of the notification destination to a second period which is longer than the first period,
wherein the receiving, the determining, the setting, and the transmitting are implemented at least in part by a CPU executing at least one program recorded on a memory.

22. The computer readable medium according to claim 21, wherein the information-processing apparatus is a printing apparatus.

23. The computer readable medium according to claim 21, wherein the network in the specific range is a sub network on which the information-processing apparatus exists.

24. The computer readable medium according to claim 21,
wherein, in a case where the information-processing apparatus is activated, the information-processing apparatus transmits a startup notification message, and
wherein the network in the specific range matches a network where the startup notification message arrives.

* * * * *